Patented Oct. 23, 1945

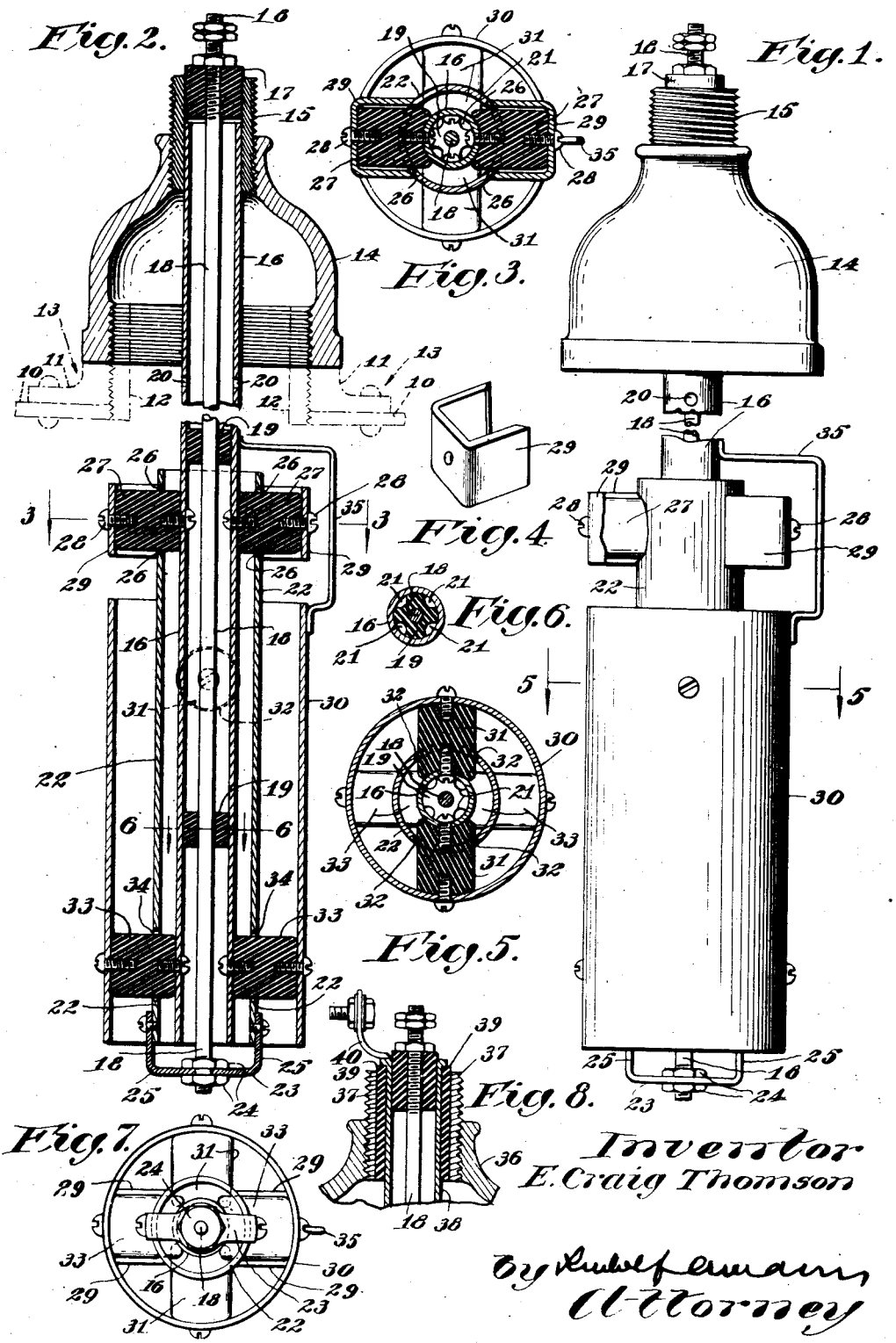

2,387,365

UNITED STATES PATENT OFFICE 2,387,365

SYSTEM OF TUBULAR ELECTRODES

E. Craig Thomson, Boston, Mass.

Application January 13, 1944, Serial No. 518,129

9 Claims. (Cl. 200—152)

The present invention relates to electrical detector devices and controls and more particularly to electrode systems for use in electric circuits for detecting the position or level of material in a container, this material affecting electric properties of the electrode system, such as ohmic resistance or capacity.

It is often essential either automatically to maintain a certain level of material in containers which are in use in industry for the purpose of storing, mixing, or otherwise utilizing many and various kinds of fluids, powders and the like, or to operate a signal or relay device when the level in the container reaches a high or low point beyond which it might become dangerous or damaging to other equipment. In most instances it is highly desirable to avoid the use of moving parts and complicated mechanical installations in connection with such containers. This result can best be accomplished by electrical means incorporating one or more electrodes adapted to be easily mounted through an opening in the side or top of the container. Electrode devices of this type may be used in supervisory circuits such as disclosed in my copending application Serial No. 518,127, filed January 13, 1944, wherein they constitute probes for detecting a variable ohmic resistance, or they may be used as detecting elements with variable capacitance characteristics in circuits which employ detecting condensers. In the first instance, the material to be supervised will be essentially a conductor, whereas in the other instance dielectric properties of the material are essentially made use of.

It is also desirable in electrical level detecting devices of this nature that an electrode designed for mounting on the top of a container be highly responsive to change in material level over only a small portion of its length, to insure accurate detection of the predetermined level.

Furthermore, the difference in electrical characteristics between the material in question and atmosphere or between two materials in the same container may be so small as to require high sensitivity in the electrical circuit in order to indicate whether the electrode is immersed in one medium or the other. Under such conditions it is imperative, first, that the electrode be adequately shielded from extraneous electrical fields which might cause faulty operation, and second, that the construction of the electrode be not only sufficiently rigid to minimize the possibility of accidental misalignment of its members, but also so arranged that any slight misalignment which occurs does not appreciably affect the electrical response.

One of the principal objects of my present invention is therefore to provide an improved electrode system suitable for level detection of materials, either conductive or nonconductive; another object is to provide an electrode especially responsive to changes in level near its lower end; a further object is to provide an electrode having inherent in its construction compensating features which tend to overcome or correct accidental misalignment of its members; and still another object is to provide an electrode system which is electrostatically shielded.

Other objects, aspects and features of the construction and operation of my invention will be apparent from the following description of a practical embodiment thereof by way of illustration. This description refers to a drawing in which:

Fig. 1 is a side elevation of the device, portions of which are broken out;

Fig. 2 is a vertical cross-section, portions of which are broken away, and other portions of which are shown in elevation;

Fig. 3 a cross-section taken on line 3—3 of Fig. 2, showing spacers between the electrode tubes, portions of which are shown in elevation;

Fig. 4 a perspective view of one of the saddle members also shown, in cross-section, in Figs. 2 and 3;

Fig. 5 a cross-section taken on line 5—5 of Fig. 1, partly in elevation, and showing insulated spacers;

Fig. 6 a cross-section taken on line 6—6 of Fig. 2, particularly showing a vented insulation spacer;

Fig. 7 a bottom plan view of the probe, and

Fig. 8 a fragmentary vertical cross-section, portions of which are shown in elevation, and particularly showing a modified form of mount housing for use in installations in which the container is constructed of electrically nonconductive material, such as glass or other material, or where, for other reasons, it is impossible to obtain a common ground potential for the tubes.

In the drawing, 10 indicates the shell of a container, 11 is a flange attached to the container shell 10, and 12 is a close-nipple; these three members will hereinafter be referred to as the container 13.

Attached to the container 13 is a threaded housing 14 which comprises a portion of the probe mount. Threaded into the upper end of the housing 14 is a close-nipple member 15, the lower portion of the inner diameter of which is fitted with a tubular conductor member 16, tube 16 and close-nipple 15 being brazed together or attached in any practicable manner. In the upper end of the close-nipple 15, is tightly fitted an insulation sleeve 17 within which is secured a central electrical conductor member 18.

As shown in Fig. 2, the central conductor 18 extends the entire length of tube 16 and is at intervals spaced from tube 16 by means of insulation spacers 19 which maintain the members 16 and 18 in coaxial alignment with each other. Adjacent the upper end of tube 16 there are provided orifices 20 the purpose of which is to vent tube 16 and allow for the displacement of air or other material from the tube when the material in the container 13 rises around the electrode device, and to prevent the formation of a vacuum in the tube when the level of the material in the container recedes. It will also be noted that there are provided vented areas 21 in the spacing members 19 permitting fluids in the container 13 to rise and fall freely in tube 16. The spacers 19 may be located at any desired intervals determined by the length of the electrode device or other requirements.

Surrounding the lower portion of the tubular conductor 16 is an electrode tube 22. This tube 22 is also maintained in coaxial alignment with the conductor tube 16 and the central conductor member 18. The two tubes 16 and 22 are maintained in spaced coaxial alignment at their lower ends by means of a bridge member 23, better shown in Figs. 2 and 7. The bridge member 23 is secured to the end of the central conductor 18, which protrudes from the lower end of the conductor tube 16, being held in place by means of the nuts 24, the right-angle sides 25 of the bridge member 23 being screwed to the outer surface of the lower end of electrode tube 22. The conductor member 18 is fixed, by means of the spacers 19, in a concentric position relatively to tube 16, and the right-angle sides of bridge member 23 are also fixed concentrically to conductor 18. Therefore the lower ends of the two tubes 16 and 22 must necessarily assume a concentric relationship with each other. The bridge member 23 also acts as a direct electrical conductor between the conductor 18 and the electrode tube 22. The upper end of tube 22 is maintained in a concentric position with respect to the conductor member 18 as follows: At this end no direct electrical contact should exist between the tubes 16 and 22. For this purpose there is provided an orifice 26 in opposite sides of the tube 22 through which are inserted insulation members 27, the inner ends of which are screwed or otherwise attached to the outside of the conductor tube 16. On the outer ends of the insulation members 27 are secured, by means of the screws 28, the saddle members 29, shown in perspective in Fig. 4. It will be noted from Fig. 3 that the free ends of the saddle members 29 engage the outside surface of tube 22 thereby concentrically positioning the upper end of tube 22 relatively to tube 16 and conductor member 18 but at the same time preventing direct contact between tube 16 and the upper end of tube 22. Unlike tube 16, electrode tube 22 is open at both ends and is much shorter. It is located adjacent the lower end of tube 16 in coaxial alignment therewith.

Surrounding electrode tube 22 is arranged a second electrode tube 30 which is shorter than tube 22 and also in coaxial alignment with tubes 16 and 22 and the conductor member 18. The second electrode tube 30 is maintained in concentric relationship with tubes 16 and 22, as well as with conductor member 18 by means of two sets of insulation spacing members located adjacent the upper and lower ends of tube 30. Fig. 5 illustrates the upper portion, showing the insulation spacing members 31 located between the tubes 16 and 30, orifices 32 being provided in the opposite sides of the electrode tube 22 to allow the insulation members passageway to the sides of the tube 16. In a like manner, adjacent the lower end of the tube 30, and forming a ninety degree angle therewith, are provided a second set of insulation spacers 33 passing through the orifices 34 located through the opposite sides of electrode tube 22. It will thus be seen that the shorter second electrode tube 30 is also held in coaxial alignment with the first electrode member 22, and the two conductor members 16 and 18, respectively. The outer electrode tube 30 is directly connected with conductor tube 16 by means of conductor clip 35.

In the apparatus illustrated and described in Figs. 1 to 7 inclusive, it is assumed that the container 13 is constructed from an electrically conductive material, such as metal and that, therefore, ground potential is established for the tubes 16 and 30 through the close-nipple 15 and the mount housing 14 which are directly connected to the container 13. However, in some installations, the container 13 may be insulated from the ground or formed from a nonconductive material, such as glass or for other reasons it may be desirable that the detecting electrode 30 have no electrical contact with the container 13. Fig. 8 illustrates a modified housing mount for use under such conditions, in which 36 indicates the housing member which is normally attached to a container such as indicated at 13 into which is screwed a close-nipple 37. Between the conductor tube 38 and the close-nipple 37 there is provided an insulating sleeve 39 which insulates the tube 38 from the housing member 36 and any container to which the housing may be attached. An electrical terminal means 40 of any suitable type is provided to make contact with tube 38.

Due to the fact that tubes 16, 22 and 30 are coaxially arranged, any reduction in capacitance or resistance on one side of the electrode, resulting from slight sidewise displacement of one of the tubes, is compensated for by the increase in capacitance or resistance on the opposite side.

Furthermore, the tubes 16 and 30, if at ground potential, provide an electrostatic shield around conductor member 18 and electrode tube 22.

It should be understood that the present disclosure is for the purpose of illustration only and that this invention includes all modifications and equivalents which fall within the scope of the appended claims.

I claim:

1. An electrode system for use in an electrical circuit, comprising a central rod-shaped conductor, two tubular conductors, means for mounting said tubular conductors coaxially around said central conductor, means for insulating one of said tubular conductors from said central conductor, means for conductively connecting the other tubular conductor and said central conductor, and means for conductively connecting said central conductor and said first tubular conductor to said electrical circuit, whereby increasing distance at one side between said conductors due to accidental misalignment is compensated for by decreasing distance at the other side.

2. An electrode system for use in an electrical circuit for indicating the level of material in a container, comprising a mount adapted to be fastened to a container, an electrical conductor, three tubular electrode members, insulating means for mounting said members concentrically around said conductor, means for conductively connecting one of said members to said conductor, means for conductively connecting the two other members, and means for fastening said conductor and one of said other members to said mount.

3. An electrode system for use in an electrical circuit for indicating the level of material in a container, comprising a mount adapted to be fastened to a container, an electrical conductor, means for fastening said conductor to said mount, a plurality of tubular conductors having stepped diameters, means for mounting said tubes in coaxial alignment with said conductor, and means for conductively joining alternate conductors while permitting circulation of material therebetween.

4. An electrode system for use in an electrical circuit, comprising a central conductor, two tubular conductors coaxially surrounding said central conductor, means for conductively connecting the inner tubular conductor and said central conductor, and means for conductively connecting said outer tubular conductor to a ground potential, in order that said outer conductor may shield said inner conductors from external electric fields.

5. An electrode system for use in an electric circuit for indicating the level of material in a container, comprising a supporting housing adapted to be fastened to said container, an elongated electrical conductor mounted with one end on said housing, an electrical conductor tube mounted with one end on said housing and coaxially surrounding said conductor, insulating spacing means between said conductor and said tube, an electrode tube coaxially surrounding a portion of said conductor tube, means for electrically connecting said electrode tube to said conductor, a second electrode tube coaxially surrounding said tubes, means for electrically connecting said second electrode tube to said conductor tube, and insulating spacer means for maintaining the relative positions of said tubes.

6. A electrode system for use in an electric circuit for indicating the level of material in a container, comprising a supporting housing adapted to be fastened to said container, an elongated electrical conductor mounted on said housing, means for insulating said conductor from said housing, a vented electrical conductor tube mounted on said housing and coaxially surrounding said conductor, insulating and vented spacing means between said conductor and said tube, an electrode tube coaxially surrounding said conductor tube and being electrically connected to said conductor, a second electrode tube coaxially surrounding said first probe tube and being electrically connected to said conductor tube, and spacing insulators between said tubes arranged to permit circulation of material therebetween.

7. An electrode system for use in an electric circuit for indicating the level of material in a container, comprising a conductor member, means for mounting said conductor member on said container, a vented conductor tube coaxially surrounding said conductor member, insulating and vented spacer members between said conductor member and said tube, an electrode tube coaxially surrounding a portion of said conductor tube and being electrically connected with the lower end of said conductor member, insulators located between the upper end of said electrode tube and said conductor tube for the purpose of maintaining spaced relationship between the two tubes, a second electrode tube coaxially surrounding a portion of said first electrode tube, insulating spacers separating said conductor tube from said second electrode tube, and an electrical conductor member connecting said conductor tube with said second electrode tube.

8. An electrode system for use in an electric circuit for indicating the level of material in a container, comprising a mounting housing adapted to be fastened to said container, an elongated electrical conductor, insulating means for mounting said conductor, a conductor tube conductively mounted in said housing and coaxially surrounding said conductor member, said tube being closed at its upper end and provided with a vent located below said closure, insulating and vented spider members separating said conductor member from said tube, an electrode tube coaxially surrounding the lower portion of said conductor tube and being conductively connected with the lower end of said conductor member, insulators located between the upper end of said electrode tube and said conductor tube for the purpose of maintaining spaced relationship between the two tubes, a second electrode tube coaxially surrounding the lower portion of said first electrode tube, insulating spacers separating said conductor tube from said second electrode tube, and an electrical conductor member connecting said conductor tube with said second electrode tube.

9. An electrode system for use in an electric circuit comprising a central conductor, a tubular electrode coaxially surrounding and conductively connected to an end portion of said conductor, a tubular conductor coaxially surrounding said central conductor and reaching between said central conductor and said electrode, and a second tubular conductor surrounding said electrode and conductively connected to said first tubular conductor, said tubular conductors being adapted to shield said electrode and that portion of said first tubular conductor which is within said second tubular conductor.

E. CRAIG THOMSON.